(12) United States Patent
Román et al.

(10) Patent No.: US 9,336,238 B2
(45) Date of Patent: May 10, 2016

(54) MOBILE WIRELESS OBJECT RECOGNITION AND CONTROL

(75) Inventors: Kendyl A. Román, Sunnyvale, CA (US); John Livacich, Sunnyvale, CA (US)

(73) Assignee: Evrio, Inc., Santa Clara, CA (US)

( * ) Notice: Subject to any disclaimer, the term of this patent is extended or adjusted under 35 U.S.C. 154(b) by 892 days.

(21) Appl. No.: 13/525,273

(22) Filed: Jun. 16, 2012

(65) Prior Publication Data

US 2013/0335611 A1 Dec. 19, 2013

(51) Int. Cl.
*G05B 19/00* (2006.01)
*G06F 17/30* (2006.01)
*G06Q 99/00* (2006.01)

(52) U.S. Cl.
CPC .......... *G06F 17/30247* (2013.01); *G06Q 99/00* (2013.01)

(58) Field of Classification Search
CPC ... G06F 17/30; G06F 17/30861; G06F 21/32; G06F 21/35; G06F 9/44552; H04L 12/581; H04L 51/04; H04L 12/5895; H04L 12/185; G06Q 10/10; G06Q 30/04; G06Q 30/06; G06Q 30/0623; G06T 1/0021
USPC ................ 340/5.27, 5.53, 506; 235/379, 385; 455/410, 411, 414.4; 709/19, 203, 206
See application file for complete search history.

(56) References Cited

U.S. PATENT DOCUMENTS

| | | | |
|---|---|---|---|
| 7,962,546 B2 * | 6/2011 | Colon | 709/203 |
| 8,239,464 B2 * | 8/2012 | Colon | 709/206 |
| 8,315,611 B2 * | 11/2012 | Colon | 455/414.4 |
| 8,359,239 B1 * | 1/2013 | Cook et al. | 705/19 |
| 8,386,559 B2 * | 2/2013 | Colon | 709/203 |
| 8,590,777 B1 * | 11/2013 | Roman | G06Q 10/08 235/375 |
| 8,713,560 B2 * | 4/2014 | Neumann et al. | 717/174 |
| 8,856,900 B2 * | 10/2014 | Colon | 726/7 |
| 8,992,225 B2 * | 3/2015 | Do | G09B 21/00 219/385 |
| 2003/0005428 A1 * | 1/2003 | Roman | 725/1 |
| 2003/0020816 A1 * | 1/2003 | Hunter et al. | 348/231.3 |
| 2004/0019609 A1 * | 1/2004 | Orton et al. | 707/104.1 |
| 2004/0076128 A1 * | 4/2004 | Rao et al. | 370/328 |
| 2005/0174229 A1 * | 8/2005 | Feldkamp et al. | 340/506 |
| 2005/0205660 A1 * | 9/2005 | Munte | 235/379 |

(Continued)

FOREIGN PATENT DOCUMENTS

| | | | | |
|---|---|---|---|---|
| JP | 09258820 A | * | 10/1997 | ............. G05B 23/02 |
| JP | 2000322399 A | * | 11/2000 | ............. G06F 15/177 |

(Continued)

*Primary Examiner* — Travis Hunnings

(57) ABSTRACT

A system, handheld devices, and methods for object tracking and control. The system tracks and controls items, people, and their interactions. The handheld mobile wireless device provides item specific information, instruction, and supervision. A plurality of handheld devices is configured to be used by different people, and communicate with a central database. A handheld device comprises a camera for scanning an image of an object, a display for displaying information, and a wireless network connection to the database for sending and receiving data. The system recognizes the object and identifies a person. The database includes information regarding people and their roles, permissions, and authorized or assigned tasks; objects and tools; object specific instructions; and the handheld devices. The instructions include documents, checklists, pictures, audio, and video. An observer, or the system, can monitor performance of the tasks, and provide corrective feedback.

13 Claims, 10 Drawing Sheets

(56) References Cited

U.S. PATENT DOCUMENTS

| | | | |
|---|---|---|---|
| 2005/0237967 A1* | 10/2005 | Lee et al. | 370/328 |
| 2007/0115108 A1* | 5/2007 | Martin et al. | 340/506 |
| 2008/0250458 A1* | 10/2008 | Roman | 725/61 |
| 2008/0262864 A1* | 10/2008 | Hilmer et al. | 705/1 |
| 2009/0047928 A1* | 2/2009 | Utsch et al. | 455/410 |
| 2009/0113538 A1* | 4/2009 | Eom et al. | 726/12 |
| 2009/0242631 A1* | 10/2009 | Wishnatzki et al. | 235/385 |
| 2009/0259688 A1* | 10/2009 | Do | G09B 21/00 |
| 2011/0050393 A1* | 3/2011 | Kang | 340/5.53 |
| 2012/0309353 A1* | 12/2012 | Markov et al. | 455/411 |

FOREIGN PATENT DOCUMENTS

| | | | |
|---|---|---|---|
| JP | 2007011920 A | * | 1/2007 |
| JP | 2011020758 A | * | 2/2011 |

\* cited by examiner

PRIOR ART

MOBILE WIRELESS OBJECT RECOGNITION AND CONTROL

BACKGROUND

1. Field of Invention

The present invention relates to object recognition and control, in particular the invention relates to object recognition and control including mobile wireless devices.

2. Description of Prior Art

Various attempts have been made to label objects with labels that can be read automatically by a computing machine. Barcodes have proven to be an effective scheme for achieving these purposes. Originally, linear or one-dimensional barcodes such as the Universal Product Code (UPC) were used. The UPC was the first commercially successful model and enjoyed widespread universal use.

Later a two-dimensional or matrix code was developed. These are similar to one-dimensional codes, but represent more data per unit area and traditionally utilize square pixels. While the UPC represents a serial number, matrix codes can represent text, URLs, or other data. The Quick Response Code (QR Code or QRC) is one of the most popular types of two-dimensional codes and is often used with smart phones.

More recently, a third-generation barcode called the High Capacity Color Barcode (HCCB) was developed. This two-dimensional barcode uses multi-colored triangles for an increase in data density, but still represents the same types of data.

Bar code readers are typically connected to computer systems and databases to keep track of sales or inventory.

These conventional methods have many drawbacks and limitations including the inability to identify individuals in various disciplines and roles and correlate relationships, tasks, permissions, etc. with other objects and/or individuals. In addition, these methods lack the ability to provide and present training, instructional and other information in various forms for maintenance and other purposes.

There is a need for mobile wireless handheld devices to be able to recognize various objects and people and to provide for training, instruction, tracking, monitoring, and observation, which is authorized, and object specific. Further there is a need to be able to confirm that maintenance or use procedures are performed properly while they are being performed.

SUMMARY OF THE INVENTION

It is an objective of the present invention to provide a means and method of identifying objects that include and go beyond those currently identifiable by conventional labels and go beyond existing tracking systems. Although traditional coded labels have proven to be an effective scheme for achieving item identification, they by themselves fall short of being able to achieve a more universal means and method of object recognition, training, instruction, tracking, monitoring, observation, and control. Handheld mobile wireless devices are used with objects and individuals to provide up-to-date pertinent information using methods such as on screen instructions, checklists, videos, pictures, diagrams, etc. or any combination thereof. Items and people are identified by scanning a label attached to the item or person, or by use of object recognition, facial recognition, or other biological recognition, such as iris scan, fingerprint scan, or other recognition known in the art. The system tracks and controls items, people, and their interactions. The handheld mobile wireless device provides item specific information, instruction, and supervision.

A system aspect of the invention comprises a plurality of handheld devices used by different people, and a database in communication with the handheld devices.

A handheld device comprises a camera for scanning an image of an object, a display for displaying information, and a wireless network connection to the database for sending and receiving data.

The system recognizes the object by interpreting the image. In some embodiments, a coded label, e.g. a UPC or QR code, is interpreted. The system also identifies a person. The person may be identified by being associated with the handheld device: by scanning a scan label, such as an ID badge, ID card, or tattoo; or by scanning a face, a fingerprint, an iris, or other biometric.

The database includes information regarding people and their roles, permissions, and authorized or assigned tasks; objects and tools; object specific instructions; and the handheld devices. The database also records information regarding the interaction between the objects and the people.

The roles include maintenance, use, and observation, and may vary based on the object.

The object specific instructions include documents, checklists, pictures, audio, and video.

When the handheld device scans an object, the object is recognized, the person and their role are identified, and if the person is authorized the handheld device provides object specific instructions.

In some situations, an observer is notified when use or maintenance is started by another person who is a user or a maintainer respectively.

An observer, or in some embodiments, the automated system, can monitor the proper performance of the tasks, and provide corrective feedback during the performance.

Method aspects of the invention include capturing an image with the camera of the handheld device, interpreting the image, determining an object, determining a person, and if the person is authorized determining a role of the person.

A method of performing maintenance includes identifying a current part and any associated tools, providing object specific instructions for the current maintenance task, confirm completion of the task, and recording completion of the task, and repeating for each maintenance task.

A method of performing use includes identifying tools, if any, providing object specific instructions for the current use task, confirm completion of the use, and recording information regarding the use, and repeating for each use task.

A method of performing observation includes providing object specific instructions if required, and recording information regarding the start and finish of the observation, and repeating for each observation task.

OBJECTS AND ADVANTAGES

Accordingly, the present invention includes the following advantages:

1. To provide a means and method of object recognition and control.
2. To provide a means and method of recognition and control of people.
3. To provide a means and method of object recognition and control that has a common repository.
4. To provide a means and method of object recognition and control that is role based.
5. To provide a means and method of object recognition and control that is discipline based.
6. To provide a means and method of object recognition and control that is permission based.

7. To provide a means and method of object recognition and control that is used for verification and ratification.
8. To provide a means and method of object recognition and control that is used for assembly instructions.
9. To provide a means and method of object recognition and control that is used for maintenance notification, instructions, and tracking.
10. To provide a means and method of object recognition and control that is used to log maintenance and events.
11. To provide a means and method of object recognition and control that is used to track the events in life of an object.
12. To provide a means and method of object recognition and control that is used for reporting.
13. To provide a means and method of object recognition and control that is used for presenting information in a variety of mediums including documents, pictures, diagrams, video, audio, etc.
14. To provide a means and method of object recognition and control that is used for problem solving via knowledge bases that are associated with objects and individuals.
15. To provide a means and method of object recognition and control that is inexpensive and readily available.
16. To provide a means and method of object recognition and control that is easy to use.
17. To provide a means and method of object recognition and control that is reusable.
18. To provide a means and method of object recognition and control that is quick and effective.
19. To provide a means and method of object recognition and control that is adjustable to varying conditions.
20. To provide a means and method of object recognition and control that is cost effective.

DRAWING FIGURES

In the drawings, closely related figures have the same number but different alphabetic suffixes.

Figure 1A:
FIG. 1A through FIG. 1C show prior art coded labels, such as bar codes and QR codes.

| REFERENCE NUMERALS IN DRAWINGS | | |
|---|---|---|
| 100 | a-d | coded label |
| 101 | | universal product code (UPC) |
| 102 | | quick response (QR) code |
| 103 | | high capacity color barcode (HCCB) |
| 120 | a-c | scan label |
| 200 | a-c | object |
| 210 | a-c | handheld device |
| 211 | a-c | image data |
| 212 | a-c | outgoing database information |
| 213 | a-c | incoming database information |
| 220 | | maintainer |
| 230 | | user |
| 240 | | observer |

| REFERENCE NUMERALS IN DRAWINGS -continued | |
|---|---|
| 250 | database |
| 300 | start |
| 301 | path |
| 302 | capture image |
| 303 | path |
| 304 | interpret image |
| 305 | path |
| 306 | determine object |
| 307 | path |
| 308 | determine person |
| 309 | path |
| 310 | is person authorized |
| 311 | path |
| 312 | determine role |
| 313 | path |
| 314 | no access |
| 315 | path |
| 316 | maintenance? |
| 317 | path |
| 318 | perform maintenance |
| 319 | path |
| 320 | use? |
| 321 | path |
| 322 | perform use |
| 323 | path |
| 324 | observe? |
| 325 | path |
| 326 | perform observation |
| 327 | path |
| 329 | path |
| 331 | path |
| 332 | identify part |
| 333 | path |
| 334 | identify tools |
| 335 | path |
| 336 | provide instruction |
| 337 | path |
| 338 | notify observer of start |
| 339 | path |
| 340 | confirm completion |
| 341 | path |
| 342 | record completion |
| 343 | path |
| 344 | notify observer of completion |
| 345 | path |
| 346 | more tasks? |
| 347 | path |
| 348 | exit |
| 349 | path |
| 350 | path |
| 351 | path |
| 352 | tools required? |
| 353 | path |
| 354 | identify tools |
| 355 | path |
| 356 | provide instruction |
| 357 | path |
| 358 | notify observer of start |
| 359 | path |
| 360 | confirm use |
| 361 | path |
| 362 | record use |
| 363 | path |
| 364 | notify observer of completion |
| 365 | path |
| 366 | more tasks? |
| 367 | path |
| 368 | exit |
| 369 | path |
| 370 | path |
| 371 | path |
| 372 | instruction needed? |
| 373 | path |
| 374 | provide instruction |
| 375 | path |
| 376 | record observation start |
| 377 | path |

-continued

REFERENCE NUMERALS IN DRAWINGS

| | |
|---|---|
| 378 | communicate with others |
| 379 | path |
| 380 | record observation finish |
| 381 | path |
| 382 | more tasks? |
| 383 | path |
| 384 | exit |
| 385 | path |
| 400 | roles |
| 402 | people |
| 404 | objects (tools) |
| 406 | tasks |
| 408 | task list |
| 410 | devices |
| 510 | tool |
| 520 | mounted camera |
| 530 | satellite camera |
| 540 | overhead camera |
| 550 | mounting structure |
| 560 | drone |
| 570 | satellite |
| 610 | box assembly |
| 620 | door |
| 630 | door handle |
| 640 | outer part |
| 650 | inner part |

DESCRIPTION OF THE INVENTION

Prior Art Coded Labels

Figure 1B:
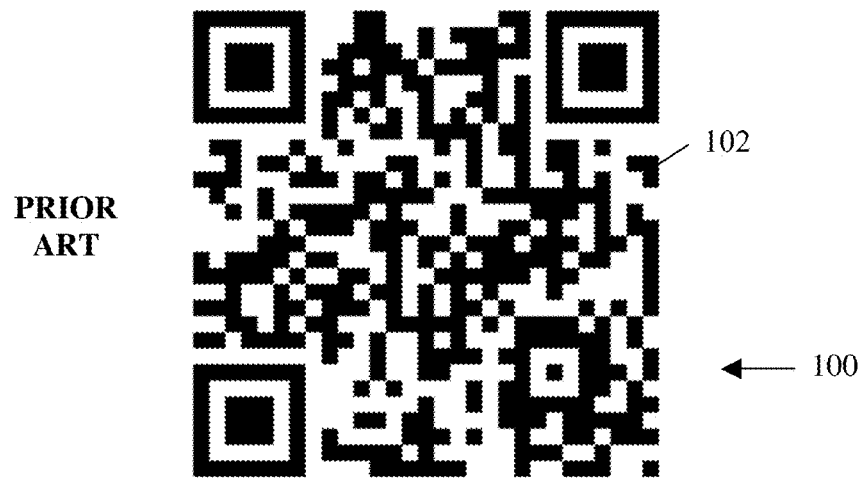
Figure 1C:
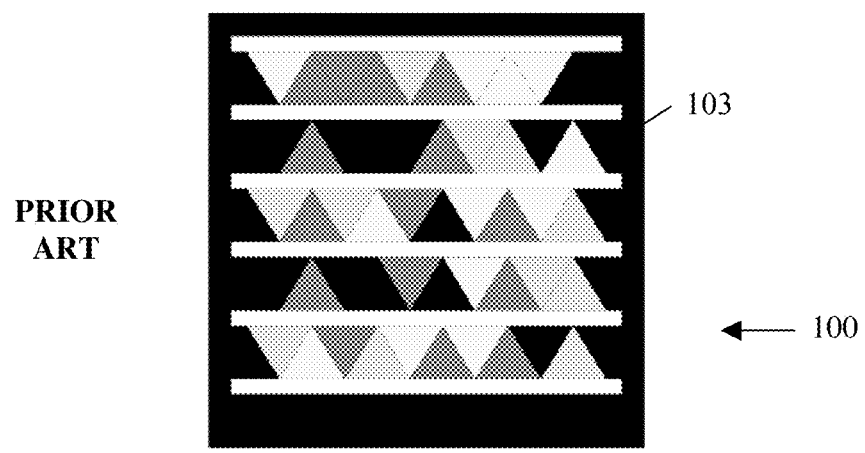

FIG. 1A through FIG. 1C show prior art coded labels 100.

FIG. 1A illustrates an example of a coded label 100 with a barcode, in particular a universal product code (UPC) 101. A barcode or UPC typically represents a number. The UPC system allows each product to have a unique code making the system universal. However, individual products can only be identified with an additional label such a serial number barcode.

FIG. 1B illustrates an example of a coded label 100 with a quick response (QR) code 102. A QR code 102 has high data density. It can encode free form text and is typically used to encode a direct address of other information such as an URL.

FIG. 1C illustrates an example of a coded label 100 with a high capacity color barcode (HCCB) 103. A HCCB may also contain a direct address such as an URL.

Handheld Devices Used for Object Recognition and Control and Instruction

Figure 2:
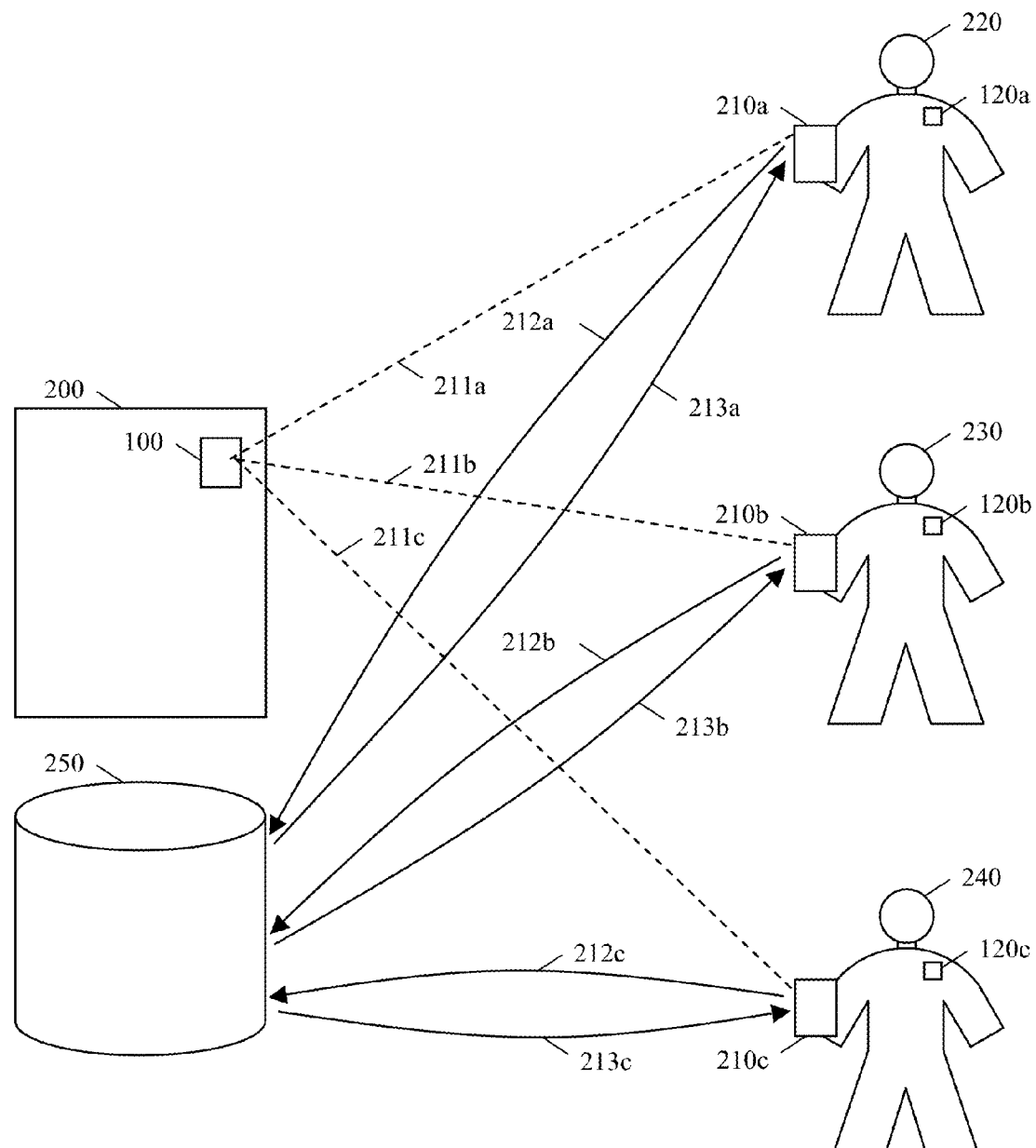
FIG. 2 illustrates the system with people with different roles and separate handheld devices communicating with the same database and server.

FIG. 2 illustrates a system with people with different roles and separate handheld devices communicating with the same database and server. Each person is shown with a handheld device 210. The handheld device 210 is preferably a mobile wireless device. The handheld device 210 includes a camera, which can scan an image of an object 200. A coded label 100 on object 200 is initially scanned as image data 211a-c by any of the handheld devices 210a-c, which is operated by a maintainer 220, a user 230, and/or an observer 240, respectively. The observer 240 can be a manager, supervisor, or team leader, etc. The handheld devices 210a-c each interacts with the same database 250 to send and receive information. Information sent to the database 250 is outgoing database information 212a-c respectively. For example, when maintainer 220 scans the coded label 100 on object 200, the image data 211a is interpreted by the handheld device 210a and the decoded data is sent to the database 250 as outgoing database information 212a. The maintainer 220 may also be recognized, for example, by scanning scan label 120a. Information sent from the database 250 to the handheld devices 210a-c is incoming database information 213a-c, respectively. Incoming database information 213 may be directed to the maintainer 220, the user 230, and/or the observer 240. The information in database 250 can include instructions, tools list and maintenance logs. The data in the database 250 may describe each person's role, authorization, security access or other information. For example, after receiving the decoded data from the handheld device 210a, incoming database information 213a sent to the maintainer 220 would include instructions and a list of tasks, which may be customized to the specific maintainer 220 (as identified e.g. by scan label 120a). The maintainer 220 may receive information about the parts on or in the identified object 200. The maintainer 220 may also receive instructions on how to perform the maintenance and the tools necessary. The maintainer 220 may be shown a video series on the handheld device 210a showing each of the steps of the required maintenance. A local handheld device (e.g. 210a) may detect whether or not the proper steps were performed. The observer 240 may be in a remote location, and may receive information about the maintainer 220, or the user 230, information on progress updates, and visual data (pictures and/or video) to oversee the tasks being performed.

The communication paths for the outgoing database information 212a-c and the incoming database information 213a-c are preferably wireless, such as WiFi or 3G or 4G wireless network protocols.

The mobile wireless handheld devices 210a-c can communicate directly to each other as enabled by the database 250, or may communicate using the database 250 as a teleconferencing server.

In some embodiments, the observer 240 observes using conventional computer or video conferencing equipment, rather than using a handheld device 210c.

Exemplary Operation

FIG. 3A through FIG. 3D provide flowcharts for method aspects of an embodiment of the invention. Other embodiments may omit or add steps, or perform steps in different orders.

Figure 3A:
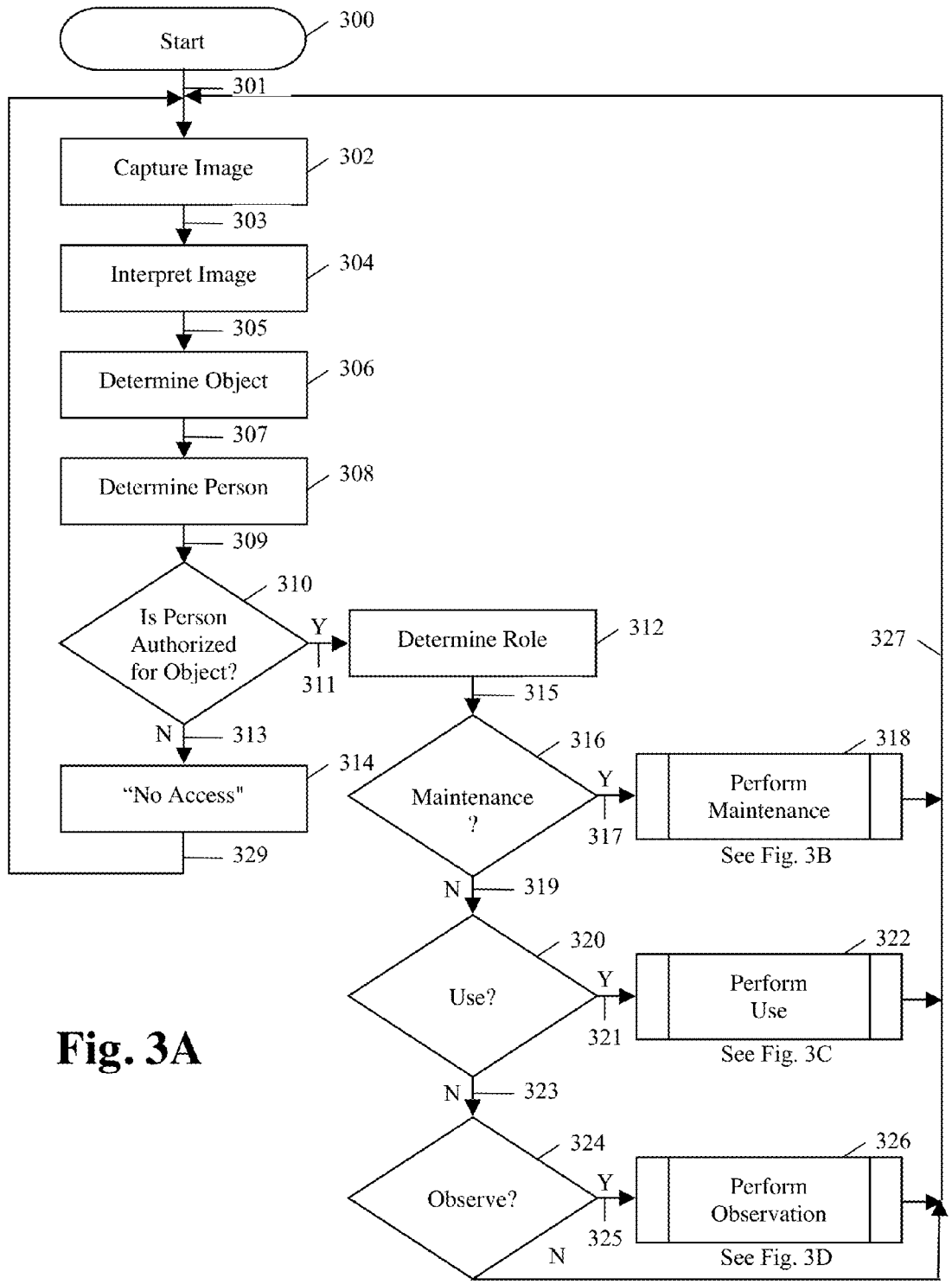
FIG. 3A through FIG. 3D illustrate flowcharts of showing the exemplary steps for the methods of the system.

FIG. 3A is a top-level flowchart. The process starts at step 300 and moves along path 301 to a capture image step 302 where the image is captured by a handheld device 210. The process moves along path 303 to an interpret image step 304 where the image is interpreted. The image may be interpreted by the handheld device 210 or by the database 250. Then the process moves along path 305 to a determine object step 306 where the object is determined from data stored in the database based on the image data 211. Then the process moves along path 307 to a determine person step 308. The person may be determined based on a device code unique to the handheld device (e.g. 210a or 210b), by the scan label (e.g. 120a or 120b), or by a face, fingerprint, or iris scan. This checks the identity of the individual running the handheld device 210. The process then moves along path 309 to a decision 310 where it checks if the person is authorized for object. If not, the process moves along path 313 to "No Access" step 314 where it will send a message stating "No Access" and moves along path 329 back to path 301. If yes, the process moves along path 311 to a determine role step 312 where the role will be determined for the person determined in step 308. Then the process decides which sub-process to perform based on the role: maintenance, use, or observation. First the process moves along path 315 to maintenance? decision 316 to decide if the role is maintenance. If yes, the process moves along path 317 to perform maintenance step 318 (see FIG. 3B) and then moves along path 327 back to path 301. If not, the process moves along path 319 to use? decision 320 to decide if the role is use. If yes, the process moves along path 321 to perform use step 322 (see FIG. 3C) and then moves along path 327 back to path 301. If not, the process moves along path 323 to observe? decision 324 to decide if the role is observe. If not the process moves along path 327 back to path 301. If yes, the process moves along path 325 to perform observation step 326 (see FIG. 3D) and then moves along path 327 back to path 301.

Figure 3B:
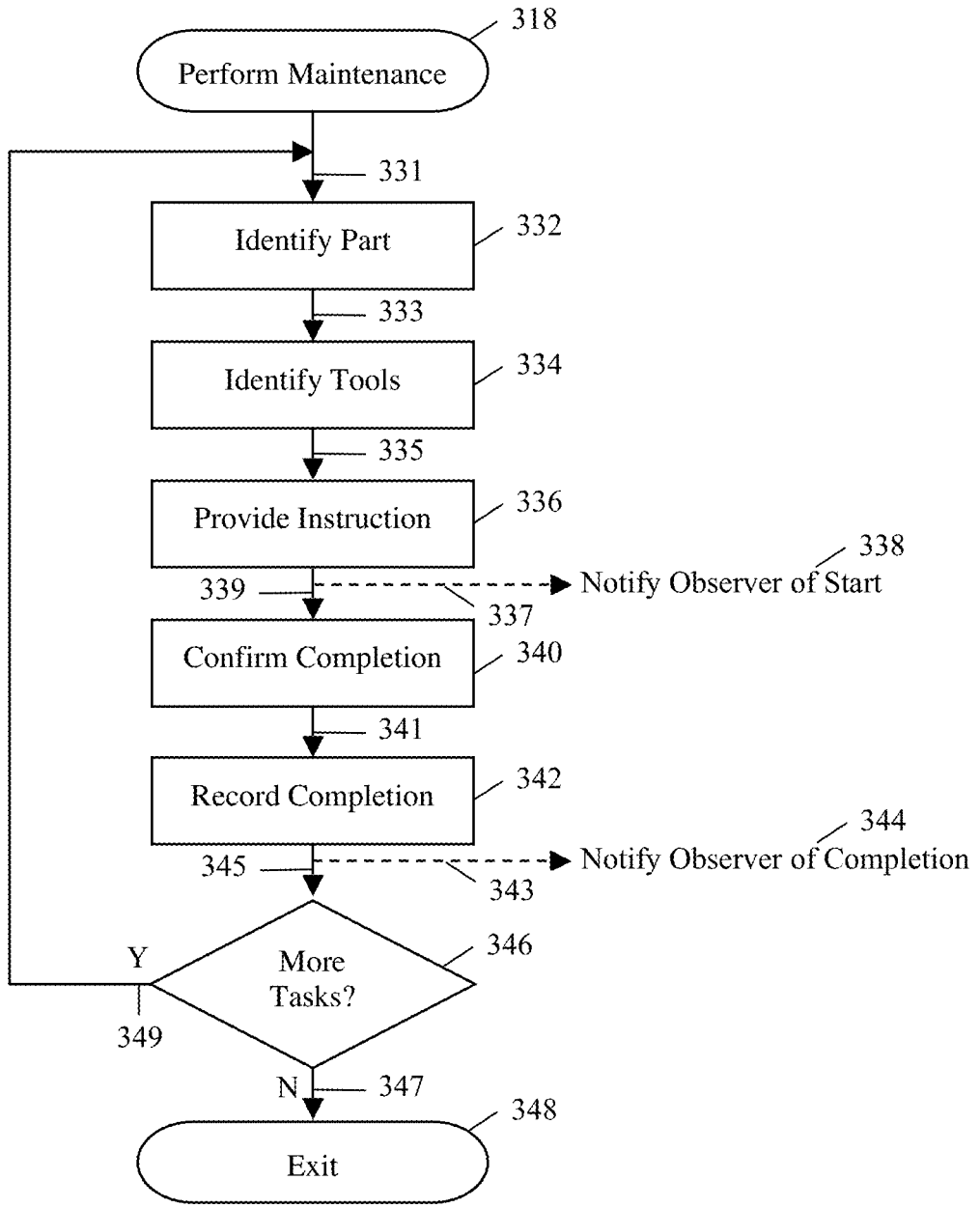
Figure 3C:
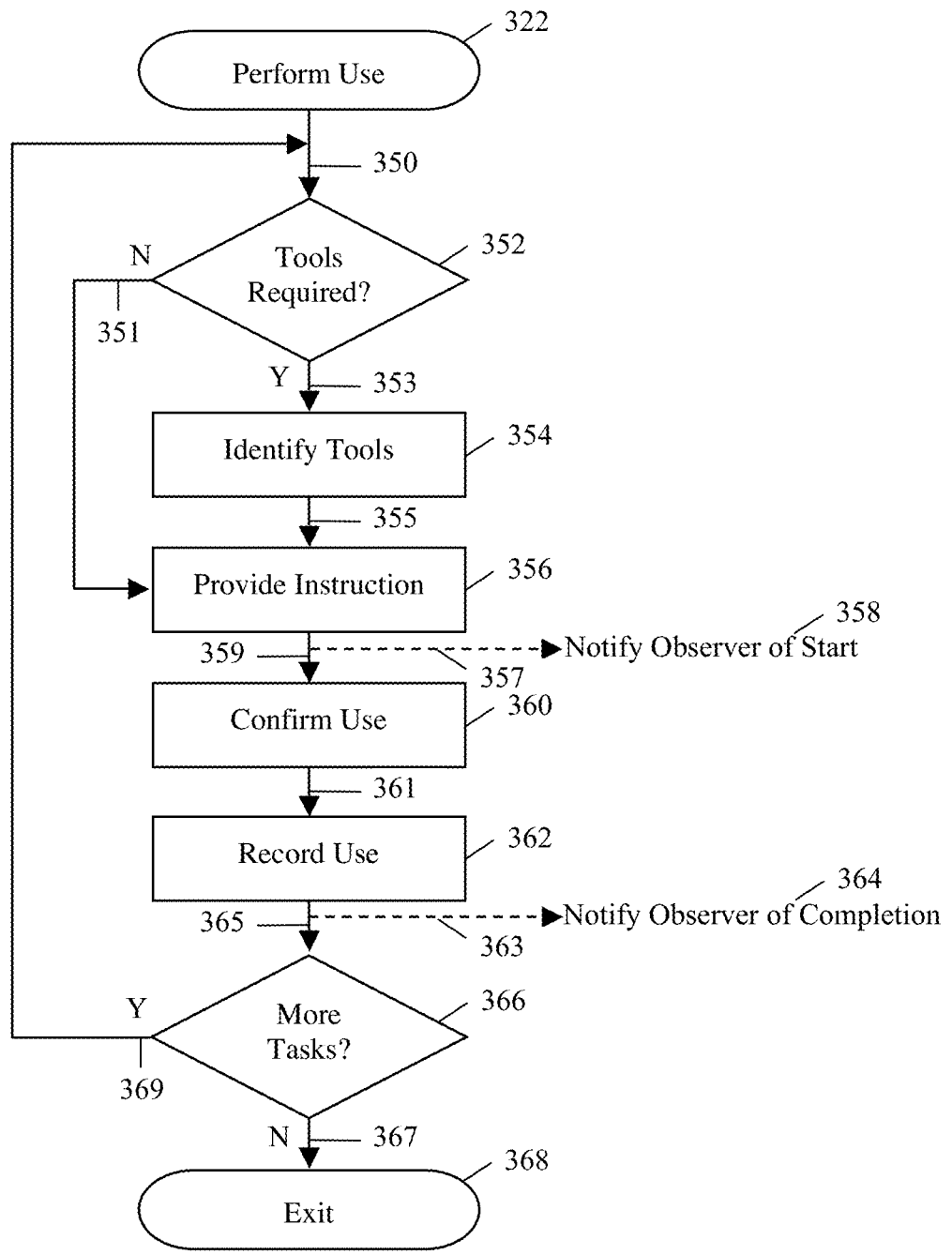

In some embodiments, the perform observation step 326 is triggered independently, for example, by the notify observer of the start of maintenance message 338 in FIG. 3B or by the notify observer of the start of use message 358 in FIG. 3C. In those embodiments, the observer 240 does not need to scan the object's label, but instead may be optionally identified by their handheld device 210c or by scanning their ID scan label 120c, and associated with the observer role by data stored in the database. In other embodiments the observer 240 is identified by the conventional computer or video conferencing equipment they are using or by their physical location.

FIG. 3B is a flowchart for the perform maintenance 318 process. The process begins along path 331 to an identify part step 332 where a maintenance part is determined. Next the process moves along path 333 to an identify tools step 334, where the tools associated with the current maintenance part are identified. The process moves along path 335 to a provide instruction step 336. Instructional information regarding the current maintenance part, use of tools, how the maintenance is performed is provided, for example, as incoming database information 213a from the database 250 to the handheld device 210a. The instructional information could include videos of the maintenance process. At event 337, a notify observer of the start of maintenance message 338 is sent. The handheld device 210c associated with the observer 240 is notified along communications path 213c. The observer can observe the maintenance procedure via pictures, audio, and/or video transmitted to the handheld device 210c (or in some embodiments, to conventional computing or video conferencing equipment). The information in message 338 is sufficient to automatically authorize and enable the observer 240 to observe the maintenance without requiring further actions by the observer 240. The observer 240 can watch what is happening and will subsequently wait for confirmation of the maintenance completion. When the maintenance is completed, the process moves along path 339 to the confirm completion step 340, the handheld device 210a will send completion information back to the database 250. The process will then move along path 341 to a record completion step 342 where the completion of the task is recorded in the database 250. The database 250 can log the time and date of the maintenance as well as logging the person who performed the maintenance, the tools used, how long it took, and so forth. At event 343, a notify observer of the completion of maintenance message 344 is sent. The observer 240 could verify that the maintenance was performed as required and can then turn attention to other matters. The optional verification could include sending a verification message to the database 250. Then the process moves along path 345 to more tasks? decision 346 to determine if there are more maintenance tasks. If so, the process moves along path 349 to path 331 to repeat the cycle. If not, the process moves along path 347 to exit 348.

FIG. 3C is a flowchart for the perform use 322 process. The process begins along path 350 to a tools required? decision 352. If so, the process moves along path 353 to an identify tools step 354 where tools are identified and continues along path 355. If not, the process moves along path 351 and skips step 354. At a provide instruction step 356, information regarding use, and tools if applicable, is provided to the handheld device 210b of the user 230. The instruction could include a checklist, pictures, audio, and/or video. At event 357, a notify observer of the start of use message 358 is sent. The handheld device 210c associated with the observer 240 is notified along communications path 213c. The observer 240 can observe the use via pictures, audio, and/or video transmitted to the handheld device 210c (or in some embodiments, to conventional computing or video conferencing equipment). The observer 240 may wait for notice of use completion. When use is completed, the process moves along path 359 to the confirm use step 360, the handheld device 210b will send use information back to the database 250. The process will then move along path 361 to a record use step 362. The database 250 can log the time and date of the use as well as logging the person who performed the use, the tools used, how long the object was used, and so forth. At event 363, a notify the observer of the completion of use message 364 is sent. Then the process moves along path 365 to more tasks? decision 366 to determine if there are more use tasks. If so, the process moves along path 369 to path 350 to repeat the cycle. If not, the process moves along path 367 to exit 368.

Figure 3D:
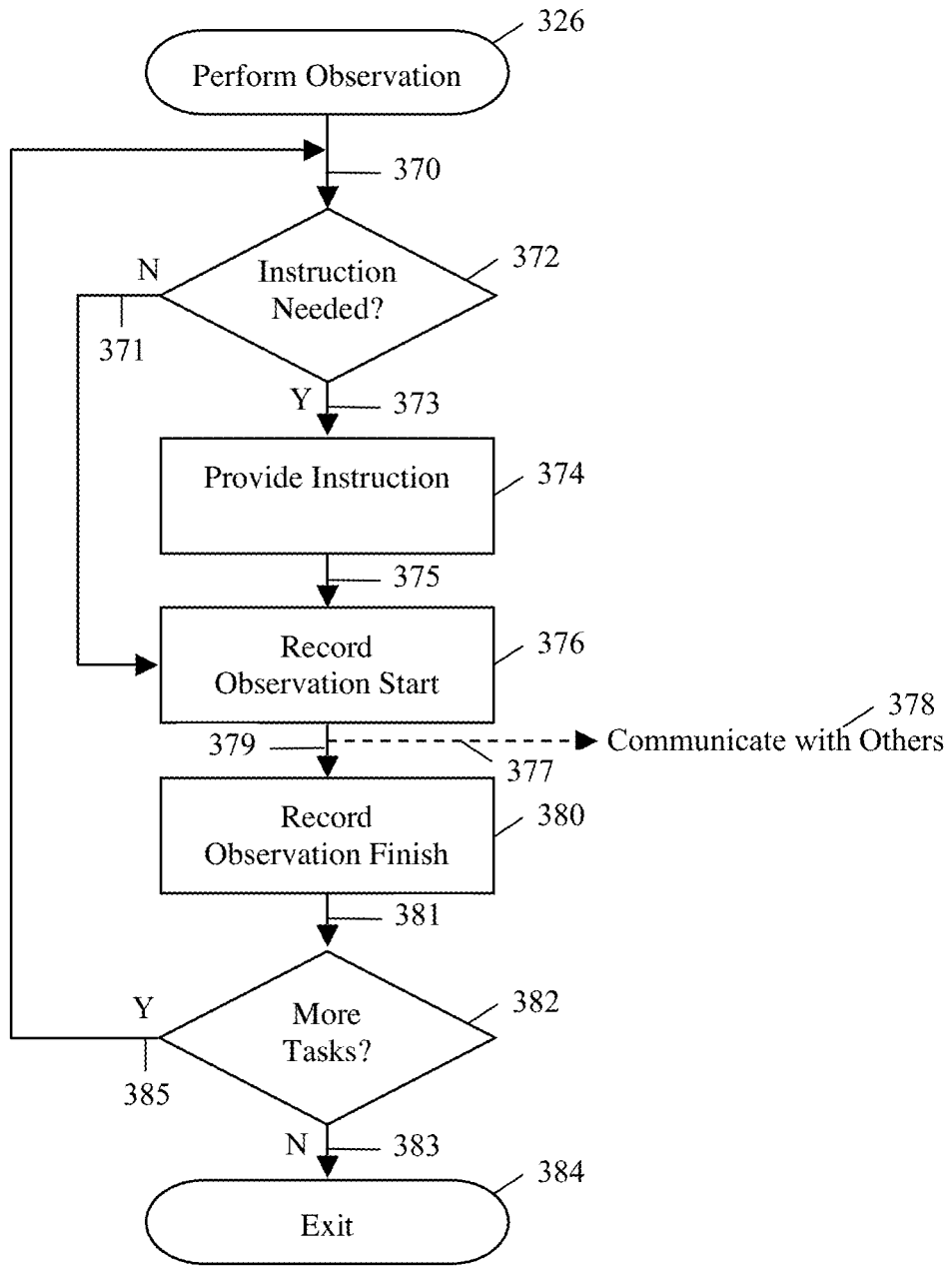

FIG. 3D is a flowchart for the perform observation 326 process. The process begins along path 370 to an instruction needed? decision 372. If so, the process moves along path 373 to a provide instruction step 374, where instruction regarding the observation is provided, and continues along path 375. If not, the process moves along path 371 and skips step 374. At the provide instruction step 374, information is provided to the handheld device 210c of the observer 240. The instruction could include a checklist, pictures, audio, and/or video. In record observation start step 376, it is noted that the observer 240 has started the observation. During the observations, at event 377, the observer 240 may communication with others, e.g. the maintainer 220 or the user 230. The communication with others 378 could be instructional, corrective or supportive information. The handheld device 210c associated with the observer 240 will send communication 378 to other handheld devices (e.g. 210a or 210b). When the observer 240 stops observing, the process moves along path 379 to the record observation finish step 380, the handheld device 210c will send observation information back to the database 250. The database 250 can log the time and date of the observation as well as logging the person who observed, how long the observation took, the types of communication that occurred during the observation, and so forth. Then the process moves along path 381 to more tasks? decision 382 to determine if there are more observation tasks. If so, the process moves along path 385 to path 370 to repeat the cycle. If not, the process moves along path 383 to exit 384.

Database

Figure 4:
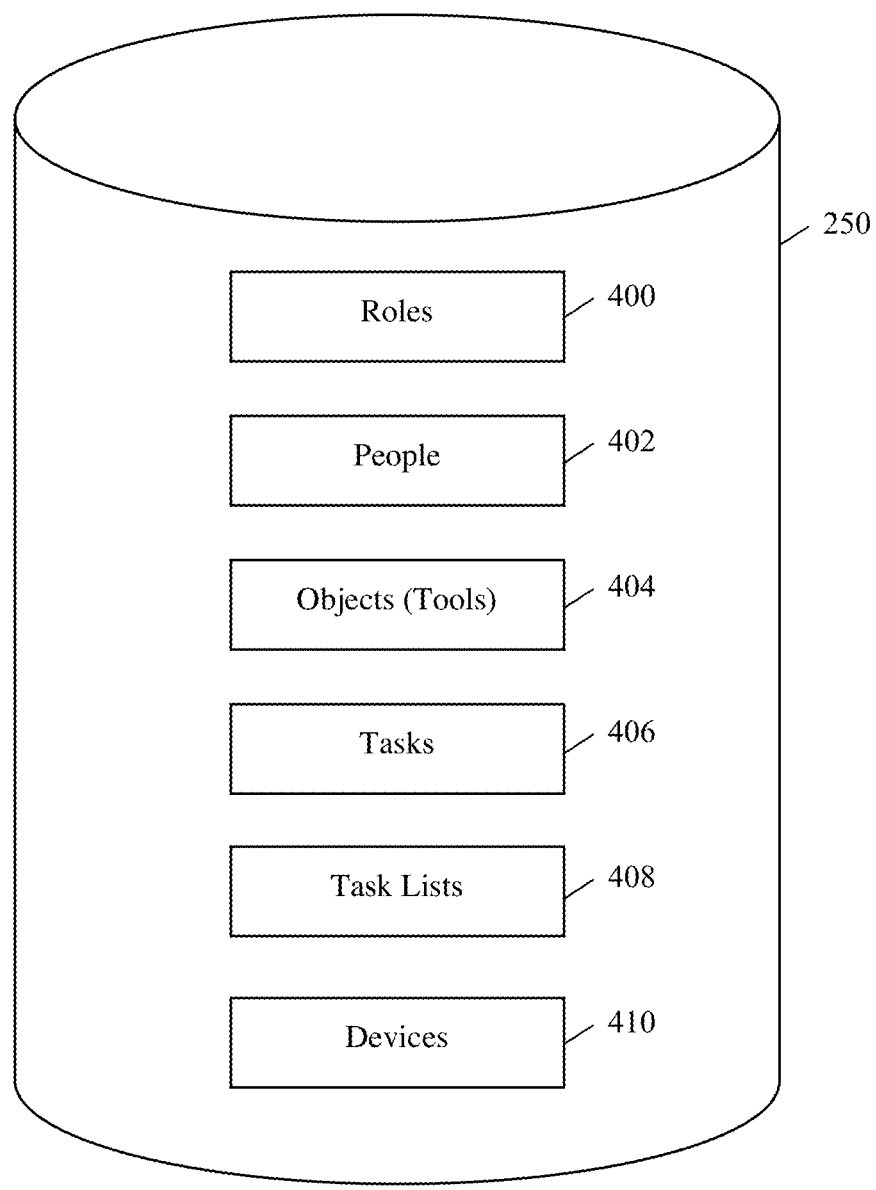
FIG. 4 illustrates the structure of the database.

FIG. 4 illustrates the types of information that the database 250 will hold and maintain. The database 250 can be any data repository including relational, hierarchical, etc. The data schema will support various entities including roles 400, people 402, objects (including tools) 404, tasks 406, task lists 408, and devices 410. The storage of this information on a single, central accessible database is valuable to proper communication and coordination.

The data regarding roles 400 include the roles of various people associated with various objects. For example, an individual may be a maintainer of a particular object, such a machine, but may be a user of another object, such a tool used to fix the machine. The individual may also be a supervisor for another maintainer and will be notified as an observer whenever the maintainer they supervise is performing maintenance. Thus the same individual may have the role of maintainer, user, and observer. These relationships are tracked in the Roles 400, People 402, and Objects (Tools) 404 data tables.

Means for identifying people such as ID badges, fingerprints, face scans, or iris scans are stored in the People 402 data table. Relationships of people 402 to roles 400, objects 404, task lists 408, and devices 410 are also tracked in the database.

Object specific tasks 406 and instructions associated with those tasks are stored in the Tasks 406 portion of the database. Object specific instructions may include documents, checklists, pictures, audio, and/or video.

Exemplary Use

Figure 5:
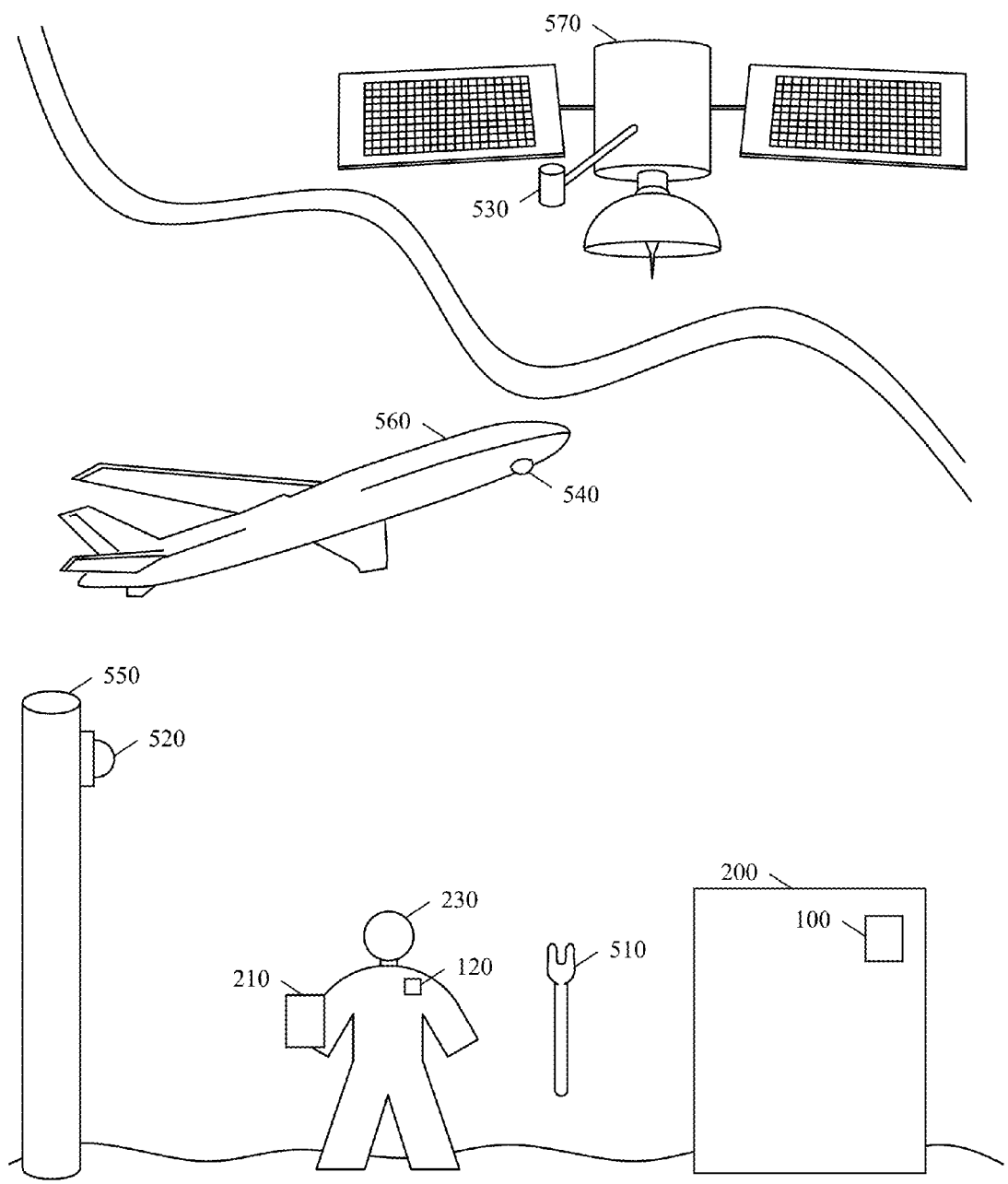
FIG. 5 shows a user with a mobile wireless device with various objects and cameras for remote observation.

FIG. 5 shows how a user 230 can use a handheld device 210 and various communication methods. The user 230, identified by the scan label 120, can access information from the handheld device 210. A remote observer 240 can observe using various cameras, such as mounted camera 520 shown on a mounting structure 550, shown as a pole, an overhead camera 540 shown mounted on an airplane or drone 560, or even a satellite camera 530 mounted on a satellite 570. The handheld device 210 can identify object 200 by reading coded label 100 to review maintenance history, to determine what tasks are to be performed using the object 200, and to get more information regarding the object 200. The database 250 can assimilate this information and determine whether the user 230 will need tools such as tool 510 for a particular use (or maintenance task). At the same time, the system tracks that the specific user 230 is interacting with the object 200. The system can notify one or more observers 240 who are required to observe or who may be interested and authorized to observe. The system may automatically observe. For example, if tool 510 is required, the system can notify the user 230, provide instructional information, including video information to the user 230 via the handheld device 210, and the monitor the use to ensure that it is performed properly. If the use (or maintenance task) is not performed properly, the system, or an observer 240, can correct the situation while the user 230 is on site and performing the task. Further, if there is a problem, additional instruction may be provided via pictures, audio, and/or video. Details of the use or maintenance, and optional observation, are stored in the database as part of the maintenance or use history and can be used to improve procedures, training, and safety.

In some embodiments, the mounted camera 520 (or even a satellite camera 530) can scan all of the coded labels 100 and scan labels 120 as well as recognize objects 200 and tools 510. Once a user 230 and the object 200 are identified in proximity, the system could instruct the user 230 via the handheld device 210 to perform the procedure. The system could observe the entire interaction and provide instruction prior to each task as well as providing corrective feedback and instruction when the wrong actions or parts are observed. The system would also record information regarding the user 230, the object 200, and the interactions.

Guided Maintenance

Figure 6A:
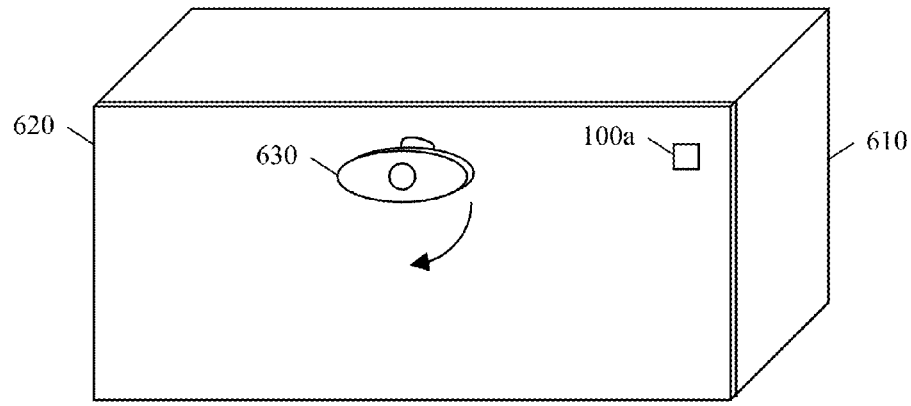
FIG. 6A through FIG. 6C illustrate an example of guided maintenance using coded labels.
Figure 6B:
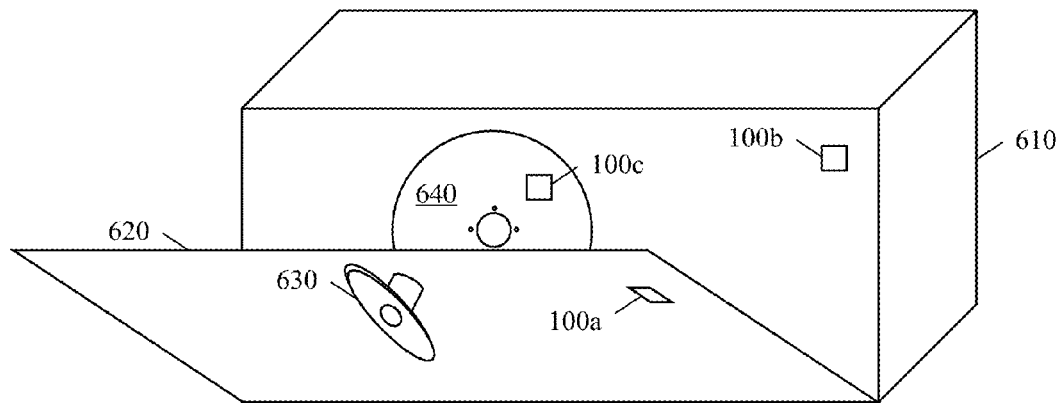
Figure 6C:
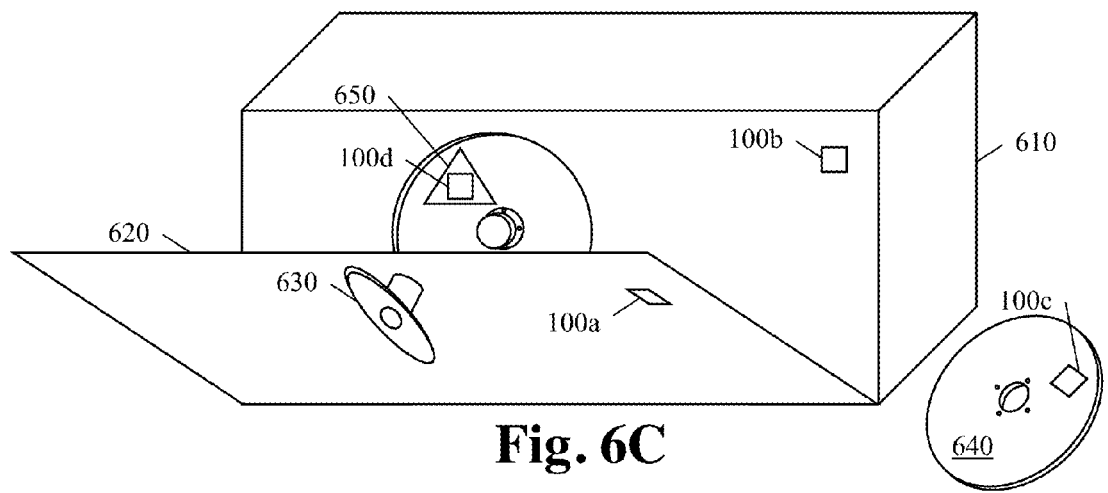

FIG. 6A through FIG. 6C illustrate an example of guided maintenance using coded labels.

FIG. 6A shows a box assembly 610. It has a coded label 100*a* for identification on the upper right-hand corner of the door 620. The assembly door 620 can be opened by turning the door handle 630. In this example, the handheld device 210 would image the object, box assembly 610, including the coded label 100*a*. The system would determine the proper maintenance procedure for the particular box assembly 610. The system would also confirm that status of the box assembly 610, e.g. that the door 620 is closed.

At this point, the handheld device 210 would provide the maintainer 220 with an overview of the maintenance procedure that is required. This instruction could include a checklist, pictures, audio, and/or video. In this example, the instructions would show how to open the door.

FIG. 6B shows the box assembly 610 with its door 620 opened. The door handle 630 has also been turned. The opened door 620 with coded label 100*a* exposes another coded label 100*b* on the body of the box assembly 610 and another outer part 640. The coded label 100*c* identifies the outer part 640, while the coded label 100*b* is used to help the handheld device recognize that the door 620 is opened.

At this point, the handheld device 210 recognizes that the door has been properly opened, that the outer part 640 is the expected internal part. Instructions are then provided for the next step, e.g. removing the outer part 640.

FIG. 6C shows a box assembly 610 as in FIG. 6B with its door 620 opened. The outer part 640 with coded label 100*c* has been removed exposing the inner part 650 with coded label 100*d*. The outer part 640 has been placed along side the box assembly 610. The inner part 650 has a coded label 100*d* to not only identify the inner part 650, but also to help the handheld device recognize that the outer part 640 has been removed.

At this point, the handheld device 210 recognizes that the outer part 640 has been properly removed, that the inner part 650 is the expected part. Instructions are then provided for the next step, e.g. replacing the inner part 650. When the inner part 650 has been replaced, the details of the replacement are recorded in the database 250. The system can also track who did the replacement, how long it took, and any problems encountered.

The system would also provide instruction and tracking of the reassembly of the box assembly.

This example has been exemplary but the same principles could apply to any piece of equipment.

Figure 7A:
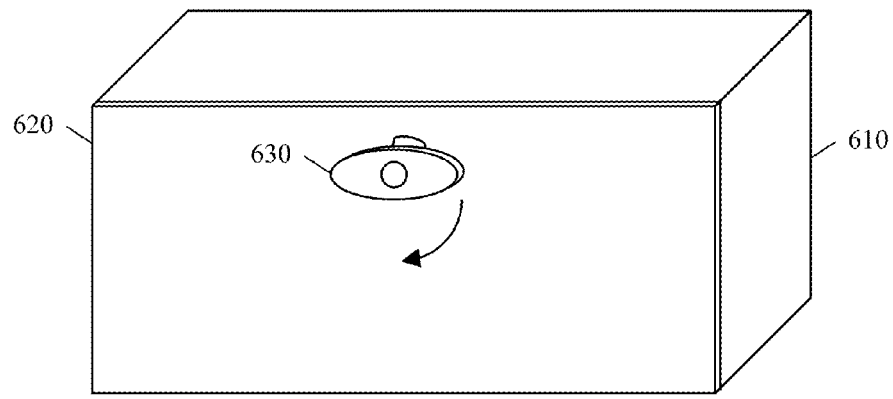
FIG. 7A through FIG. 7C illustrate an example of guided maintenance without using coded labels, using object recognition instead.
Figure 7B:
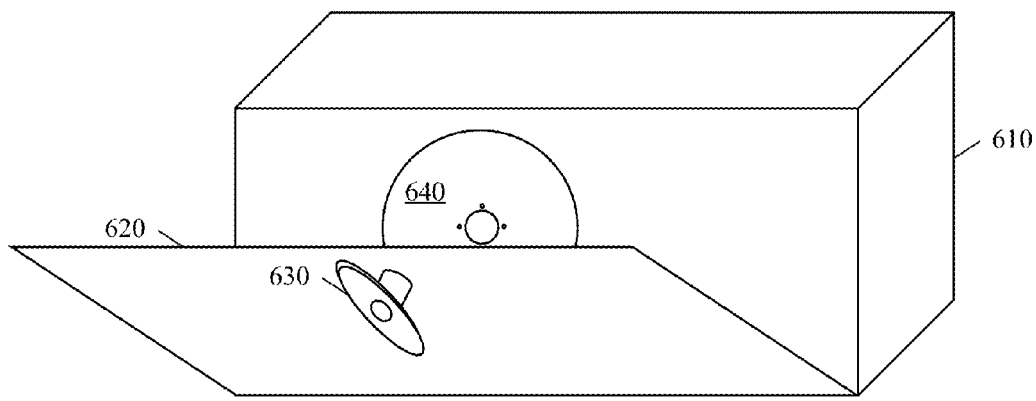
Figure 7C:
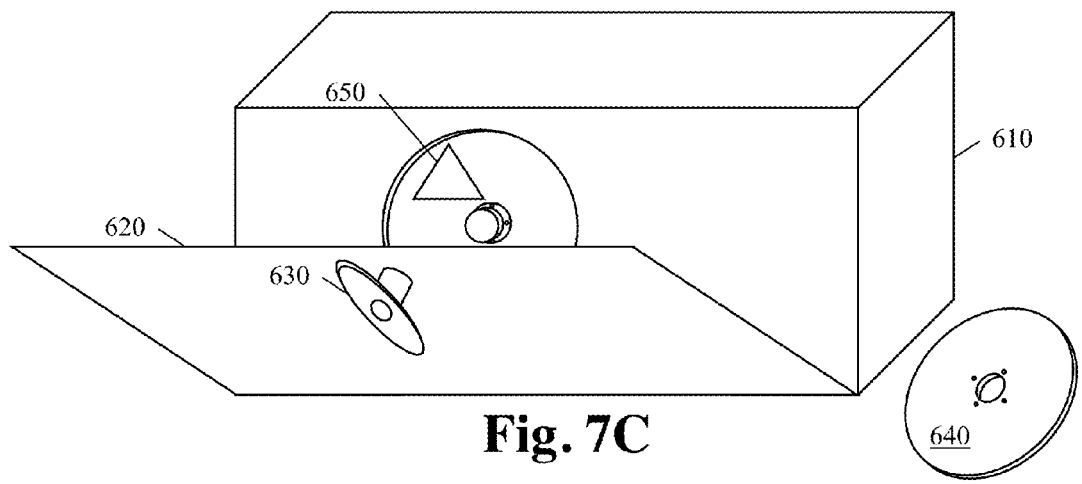

FIG. 7A through FIG. 7C illustrate an example of guided maintenance without using coded labels.

All the parts in FIG. 7A through 7C for the box assembly 610 and the maintenance are identical to the ones described in FIG. 6A through 6C with the exception of not having coded labels 100*a-d*. In this embodiment, the invention would identify all of the parts without the use of coded labels 100. Instead the handheld device 210 would use object recognition to determine the status of the maintenance process and to determine which parts were visible at any point in the process. The database 250 could store images showing what is expected at each point in the procedure and the system can compare what is being scanned by the cameras (of the handheld device 210, or mounted camera 520) with what is in the database 250.

FIG. 7A shows a box assembly 610. The assembly door 620 can be opened by turning the door handle 630. In this example, the handheld device 210 would image the object, box assembly 610. The system would determine the proper maintenance procedure for the identified box assembly 610. The system would also confirm that status of the box assembly 610, e.g. that the door 620 is closed.

At this point, the handheld device 210 would provide the maintainer 220 with an overview of the maintenance procedure that is required. This instruction could include a checklist, pictures, audio, and/or video. In this example the instructions would show how to open the door.

FIG. 7B shows the box assembly 610 with its door 620 opened. The opened door 620 exposes outer part 640.

At this point, the handheld device 210 recognizes that the door has been properly opened, that the outer part 640 is the expected part. Instructions are then provided for the next step, e.g. removing the outer part 640.

FIG. 7C shows a box assembly 610 as in FIG. 7B with its door 620 opened. The outer part 640 has been removed exposing the inner part 650. The outer part 640 has been placed along side the box assembly 610.

At this point, the handheld device 210 recognizes that the outer part 640 has been properly removed, that the inner part 650 is the expected part. Instructions are then provided for the next step, e.g. replacing the inner part 650. When the inner part 650 has been replaced, the details of the replacement are recorded in the database 250. The system can also track who did the replacement, how long it took, and any problems encountered.

The system would also provide instruction and tracking of the reassembly of the box assembly.

Advantages

Universality

The unique aspects of this invention allow for universal usage. Conventional methods due to constraints inherent in their design, or due to historical circumstances, are unable to be used universally. Even the Universal Product Code style of barcode is not used for labeling in a variety of industrial, military, postal, or inventory-related applications.

Common Repository

The present invention can be used to provide a common repository for central storage of data that can be shared among users throughout the organization and between organizations, which are working together.

Role Based

The present invention can be used to assign roles to individuals associated with various objects or tasks.

Discipline Based

The present invention can be used to assign disciplines to individuals and provide instruction, tracking and control based on those disciplines.

Permission Based

The present invention can be used to assign permissions based on roles.

Specific Media Rich Instructions

The present invention can be used to provide instructions regarding specific objects to specific individuals in a variety of mediums including documents, checklists, pictures, audio, and/or video.

Verification and Ratification

The present invention can be used to verify and ratify information for objects and individuals.

Maintenance Notification and Instructions

The present invention can be used to provide maintenance notification and instructions regarding specific objects to specific individuals.

Log Maintenance And Events

The present invention can be used to log maintenance and events for objects.

Track the Life of an Object

The present invention can be used to track a variety of events for objects.

Reporting

The present invention can be used to provide reports on given objects and individuals or a combination of the two.

Presenting Information in a Variety of Mediums

The present invention can be used to provide information in a variety of mediums including documents, checklists, pictures, diagrams, audio and/or video.

Problem Solving

The present invention can be used to provide the ability for problem solving via knowledge bases that can be associated with objects and individuals.

Inexpensive and Readily Available

The present invention can be used as a defacto standard for object identification making it inexpensive and readily available.

Easy to Use

The present invention is easy to use.

Inexpensive

Conventional methods are expensive, requiring the user to invest in expensive code-reading technology and printing costs. The present invention is inexpensive.

Quick

The present invention's unique design allow for quick use, time-saving when compared to conventional methods.

Effective

The present invention is effective, allowing for multiple sources of identification and providing helpful information to streamline the work that needs to be done.

Conclusion, Ramification, and Scope

Accordingly, the reader will see that the improved, universal, role and discipline based, low cost means and method of object identification, tracking and control are easy to use, quicker and accurate and can be used with objects or individuals to provide up-to-date pertinent information using methods such as on screen instructions, checklists, videos, pictures, diagrams, etc. or any combination thereof.

While the above descriptions contain several specifics these should not be construed as limitations on the scope of the invention, but rather as examples of some of the preferred embodiments thereof. Many other variations are possible. The variations could be used without departing from the scope and spirit of the novel features of the present invention.

Accordingly, the scope of the invention should be determined not by the illustrated embodiments, but by the appended claims and their legal equivalents.

We claim:

1. A system for object recognition and object control, the system comprising:
   a) a plurality of handheld devices configured to be used by a plurality of persons, and
   b) a database configured to communicate with the plurality of handheld devices, wherein each handheld device comprises:
      i) a camera configured to scan an image of an object,
      ii) a display for displaying information, and
      iii) a wireless network connection to the database for sending outgoing database information to the database and for receiving incoming database information from the database,
   wherein the system is further configured to recognize the object by interpreting a coded label,
   wherein the handheld device is further configured to identify a person using the handheld device, by scanning one of a face, an iris, a fingerprint, or a scan label of the person,
   wherein the database is configured to store data relating to the object, the handheld devices, and the plurality of persons,
   wherein the database data includes role information for the person based on the object, wherein the role is one of the group of maintenance of the recognized object, use of the recognized object, and observation of the recognized object, wherein the database contains object specific instructions for each role,
wherein the object specific instructions comprise one or more of the group of:
iv) checklist,
v) pictures,
vi) audio, and
vii) video;
wherein the role of the person is use,
wherein the object specific instructions include at least one video showing how to perform a task using the object,
whereby when a first one of the plurality of handheld devices scans the object, the system recognizes the object and determines the role of the person, the database sends the object specific instructions to the first handheld device, the object specific instructions are displayed on the first handheld device, and then the database records data about object recognized, the first handheld device, and the person.

2. A system for object recognition and object control, the system comprising:
a) a plurality of handheld devices configured to be used by a plurality of persons, and
b) a database configured to communicate with the plurality of handheld devices, wherein each handheld device comprises:
i) a camera configured to scan an image of an object,
ii) a display for displaying information, and
iii) a wireless network connection to the database for sending outgoing database information to the database and for receiving incoming database information from the database,
wherein the system is further configured to recognize the object by interpreting a coded label,
wherein the handheld device is further configured to identify a person using the handheld device, by scanning one of a face, an iris, a fingerprint, or a scan label of the person,
wherein the database is configured to store data relating to the object, the handheld devices, and the plurality of persons,
wherein the database data includes role information for the person based on the object, wherein the role is one of the group of maintenance of the recognized object, use of the recognized object, and observation of the recognized object,
wherein the database contains object specific instructions for each role,
wherein the object specific instructions comprise one or more of the group of:
iv) checklist,
v) pictures,
vi) audio, and
vii) video;
wherein the role of the person is observer,
wherein the observer is notified of the start of maintenance or use of the object by another person,
whereby when a first one of the plurality of handheld devices scans the object, the system recognizes the object and determines the role of the person, the database sends the object specific instructions to the first handheld device, the object specific instructions are displayed on the first handheld device, and then the database records data about object recognized, the first handheld device, and the person.

3. A system for object recognition and control, the system comprising:
a) a plurality of handheld devices configured to be used by a plurality of persons, and
b) a database configured to communicate with the plurality of handheld devices,
wherein each handheld device comprises:
i) a camera configured to scan an image of an object,
ii) a display for displaying information, and
iii) a wireless network connection to the database for sending outgoing database information to the database and for receiving incoming database information from the database,
wherein the database is configured to store data relating to the object, the handheld devices, and the plurality of persons,
wherein the handheld device is further configured to identify a person using the handheld device,
wherein the database is configured to maintain role information for the person based on the object,
wherein the role of the person is use,
wherein the object specific instructions include at least one video showing how to perform a task using the object,
whereby when a first one of the plurality of handheld devices scans the object, the system recognizes the object, the database sends object specific instructions to the first handheld device, the object specific instructions are displayed on the first handheld device, and the database records data about object recognized and the first handheld device.

4. The system of claim 3 wherein the system is further configured to recognize the object by interpreting a coded label.

5. The system of claim 3 wherein the person is identified by scanning a scan label associated with the person.

6. The system of claim 3 wherein the person is identified by scanning one of a face, or an iris.

7. The system of claim 3 wherein the database is configured to maintain role information for the person based on the object,
wherein the role is one of the group of use of the recognized object, and observation of the recognized object.

8. The system of claim 7 wherein the object specific instructions are based on the role of the person.

9. The system of claim 7 wherein the object specific instructions comprise one or more of the group of:
i) checklist,
ii) pictures,
iii) audio, and
iv) video.

10. The system of claim 3 wherein the database is configured to maintain role information for a second person based on the object,
wherein the role of the second person is observer,
wherein the observer is notified of the start of maintenance or use of the object by another person.

11. A method for object recognition and control using the system of claim 3,
the method comprising the steps of:
a) capturing an image with the camera of one of the plurality of handheld devices,
b) interpreting the image,
c) determining an object,
d) determining an identity of the person,
e) determining if the person is authorized for the object,
f) if not authorized, indicating no authorized access, g) otherwise, based on the predetermined role of the person allowing and tracking one or more of the group of:
  i) performing use, and
  ii) performing observation.

12. The method for object recognition and control of claim 11 further comprising steps for performing use of the object:
  a) if tools are required for the use of the object, identifying one or more tools,
  b) providing object specific instructions for use of the object,
  c) confirming completion of the current use task,
  d) sending completion information to the database for recording in the database,
  e) if more tasks are required, performing steps a) through d) for each remaining use task.

13. The method for object recognition and control of claim 11 further comprising steps for performing observation of the object:
  a) if instruction is needed, providing object specific instructions,
  b) sending observation start information to the database for recording in the database,
  c) sending observation finish information to the database for recording in the database,
  d) if more tasks are required, performing steps a) through c) for each remaining observation task.

* * * * *